(12) United States Patent
Nuss (10) Patent No.: US 9,393,507 B2
(45) Date of Patent: Jul. 19, 2016

(54) WATER FILTER AUDIBLE POSITION INDICATOR

(71) Applicant: General Electric Company, Schenectady, NY (US)

(72) Inventor: Bart Andrew Nuss, Fisherville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/541,344

(22) Filed: Nov. 14, 2014

(65) Prior Publication Data

US 2016/0136547 A1    May 19, 2016

(51) Int. Cl.

| | |
|---|---|
| *B01D 35/143* | (2006.01) |
| *B01D 35/30* | (2006.01) |
| *B01D 27/08* | (2006.01) |
| *B01D 35/153* | (2006.01) |
| *C02F 1/00* | (2006.01) |
| *B01D 27/10* | (2006.01) |

(52) U.S. Cl.
CPC .......... *B01D 35/1435* (2013.01); *B01D 35/306* (2013.01); *C02F 1/003* (2013.01); *B01D 27/08* (2013.01); *B01D 27/10* (2013.01); *B01D 27/101* (2013.01); *B01D 35/143* (2013.01); *B01D 35/30* (2013.01); *C02F 2307/10* (2013.01); *C02F 2307/12* (2013.01)

(58) Field of Classification Search
CPC .. B01D 35/143; B01D 35/14; B01D 35/1435; B01D 35/153; B01D 35/306; B01D 35/30; B01D 27/08; B01D 27/10
See application file for complete search history.

(56) References Cited

U.S. PATENT DOCUMENTS

| | | | |
|---|---|---|---|
| 7,491,327 | B2 | 2/2009 | Jenkins |
| 7,744,757 | B1 * | 6/2010 | Liao ...................... B01D 35/30 |
| | | | 210/232 |
| 8,097,158 | B2 | 1/2012 | Tubby |
| 2014/0174996 | A1 * | 6/2014 | Krause ............... B01D 35/1435 |
| | | | 210/91 |

* cited by examiner

*Primary Examiner* — Thomas M Lithgow
(74) *Attorney, Agent, or Firm* — Dority & Manning, P.A.

(57) ABSTRACT

A water filter assembly having a manifold with a rotatable cylinder in which a filter cartridge is removably received is provided. The filter assembly has a noise generator adjacent to the rotatable cylinder of the manifold. When the filter cartridge with the rotatable cylinder is rotated between an installed position and an uninstalled position, the noise generator creates an audible noise. The noise may indicate, for example, that the filter cartridge may be removed from the manifold.

20 Claims, 13 Drawing Sheets

WATER FILTER AUDIBLE POSITION INDICATOR

FIELD OF THE INVENTION

The subject matter of the present disclosure relates generally to a water filter for an appliance.

BACKGROUND OF THE INVENTION

Certain refrigerator appliances include water filter assemblies for filtering water. Water filter assemblies can filter water entering the refrigerator appliances in order to provide filtered water to various refrigerator appliance components, such as an ice maker and/or a water dispenser. Such filtering can improve a taste and/or an appearance of water within the refrigerator appliances.

Certain water filter assemblies include a manifold and a filter cartridge. The manifold is mounted to a cabinet of the refrigerator appliance and directs unfiltered water into the filter cartridge and filtered water out of the filter cartridge. The filter cartridge includes a filter media, such as an activated carbon block, a pleated polymer sheet, a spun cord material, or a melt blown material. The filter media is positioned within the filter cartridge and filters water passing therethrough.

Over a period of use, a filter may eventually become clogged or otherwise depleted—requiring replacement. Accordingly, the water filter assembly may include a filter cartridge that is readily replaceable. For example, the filter may be provided in a cartridge that can be removed from a manifold and replaced with a new cartridge.

Various configurations of a water filter assembly having a manifold and removable filter cartridge are possible. For example, one configuration may require a user to push the filter cartridge while twisting to remove the filter cartridge from the manifold. Other configurations may require a user to press a button or lever to release the filter cartridge from the manifold. The variety of imaginable configurations may result in confusion about the applicable removal procedure for a given configuration.

Accordingly, a water filter assembly for an appliance would be useful. More particularly, a water filter assembly providing a clear indication of the appropriate filter cartridge installation and removal process would be particularly beneficial.

BRIEF DESCRIPTION OF THE INVENTION

The present invention provides a water filter assembly having a manifold with a rotatable cylinder in which a filter cartridge is removably received. The filter assembly has a noise generator adjacent to the rotatable cylinder of the manifold. When the filter cartridge with the rotatable cylinder is rotated between an installed position and an uninstalled position, the noise generator creates an audible noise. The noise may indicate, for example, that the filter cartridge may be removed from the manifold. Additional aspects and advantages of the invention will be set forth in part in the following description, or may be apparent from the description, or may be learned through practice of the invention.

In one exemplary embodiment, the present invention provides a water filter assembly. The assembly includes a manifold that defines an inlet for receiving unfiltered water and an outlet for directing filtered water out of the water filter assembly. The manifold includes a housing and a rotatable cylinder received within the housing. The rotatable cylinder includes an actuator and defines a port. A filter cartridge is removably received into the port of the manifold. The cartridge includes a housing and a filtering media positioned therein for filtering a flow of water through the water filter assembly. The filter cartridge with the rotatable cylinder is rotatable between an installed position and an uninstalled position. A noise generator is positioned adjacent to the cylinder such that the actuator of the rotatable cylinder engages the noise generator and creates an audible noise as the cylinder is rotated between the uninstalled position and the installed position.

In another exemplary embodiment, the present invention provides a water filter assembly. The assembly includes a manifold that defines an inlet for receiving unfiltered water and an outlet for directing filtered water out of the water filter assembly. The manifold includes a housing and a rotatable cylinder received within the housing. The manifold defines a port. A filter cartridge is removably received into the port of the manifold. The cartridge includes a housing and a filtering media positioned therein for filtering a flow of water through the water filter assembly. The filter cartridge with the rotatable cylinder is rotatable between an installed position and an uninstalled position. The water filter assembly further includes a base and a retaining clip mounted to the base. The retaining clip has a pair of arms protruding away from the base for receiving the filter cartridge therebetween in the installed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
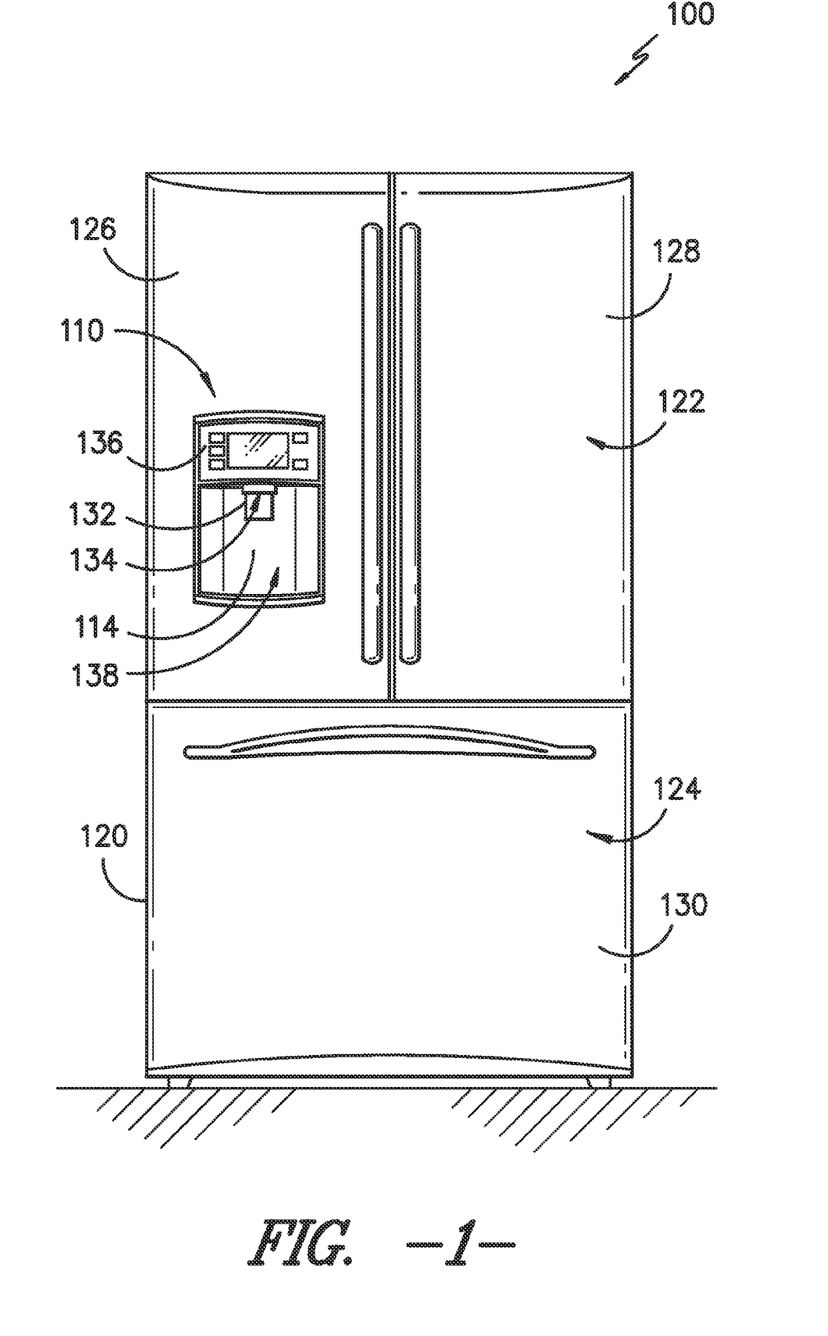
FIG. 1 provides a front view of an exemplary refrigerator appliance as may be equipped with a water filter assembly of the present invention.

FIG. 1 is a front view of an exemplary embodiment of a refrigerator appliance 100 as may be equipped with an exemplary water filter assembly of the present invention. However, as will be understood using the teachings disclosed herein, the water filter assembly (including the filter cartridge) of the present invention may be used with other refrigerator appliance configurations as well as other types of appliances. It may also be used in applications other than appliances as well. For example, the filtering system of the present invention could be installed under a kitchen sink or as part of a whole housing filtration system. As such, refrigerator appliance 100 is provided only by way of example of an application of the exemplary water filtration system of the present invention.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

Figure 2:
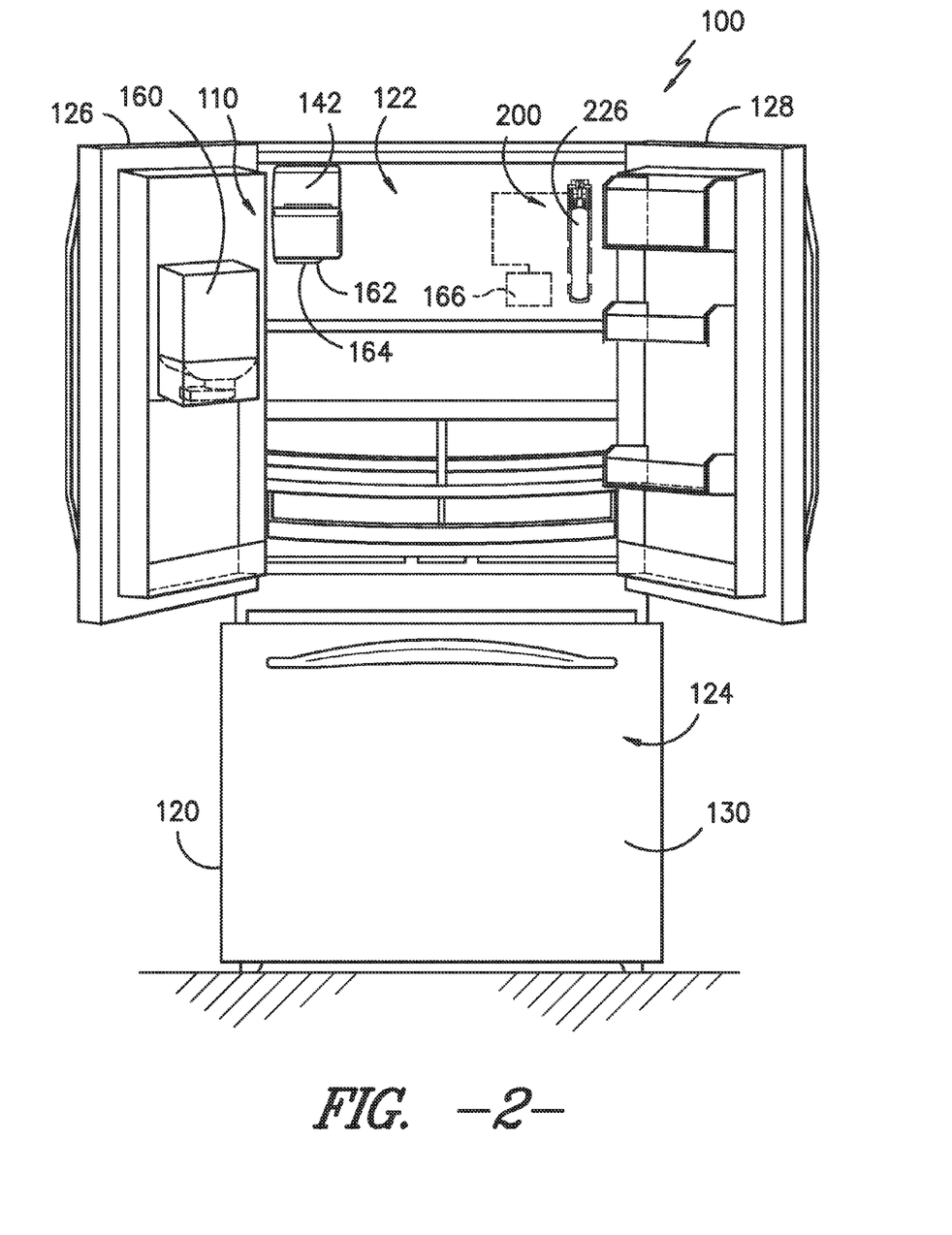
FIG. 2 provides a front view of the refrigerator appliance of FIG. 1 with the refrigerator doors in an open position.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller 166 that is in communication with (or operatively coupled with) user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, controller 166 operates various components of the refrigerator appliance 100. Controller 166 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 166 may be positioned in a variety of locations throughout refrigerator appliance 100 in addition to the location shown in FIG. 2. For example, controller 166 may be located within or beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface panel 136 may be in communication with the controller via one or more signal lines or shared communication busses.

Refrigerator appliance 100 also includes an exemplary water filter assembly or water filter assembly 200 that filters water coming into refrigerator appliance 100 from a water supply (not shown), such as a municipal water source or a well. Water filter assembly 200 can remove contaminants, such as chlorine, chloroform, lead, arsenic, pharmaceuticals, microbes, and/or other undesirable substances, from water supplied to refrigerator appliance 100. In particular, water filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

For this exemplary embodiment, water filter assembly 200 is shown positioned within fresh food chamber 122. However, water filter assembly 200 may also be located e.g., on the exterior of refrigerator 100, on a surface adjacent to refrigerator 100, connected into a water supply line (not shown) providing water to refrigerator 100, and other locations as well. Also, as stated above, water filter assembly 200 could also be located under a sink, configured as part of a whole house filtration system, or otherwise configured for other applications as well.

Referring now to FIGS. 3-7, this exemplary embodiment of water filter assembly 200 includes a filter manifold 202. The manifold 202 comprises a housing 300 (FIG. 7) that defines water inlet 206 and water outlet 208. Water inlet 206 and water outlet 208 are provided for a flow of unfiltered water into water filter assembly 200 (arrow I) and a flow of filtered water out of filter assembly 200 (arrow O), respectively. Water inlet 206 and water outlet 208 are adapted for coupling filter manifold 202 to a water supply system such as e.g., the piping system within a user's dwelling that may be connected with a well or municipal water supply. By way of example, water inlet 206 and water outlet 208 may be equipped with slip fittings, threads, fasteners, and/or other mechanisms for attachment. Apertures 210 allow for connection of filter assembly 200 to a wall, cabinet, or other surface. Other methods of attachment may also be used.

Figure 5:
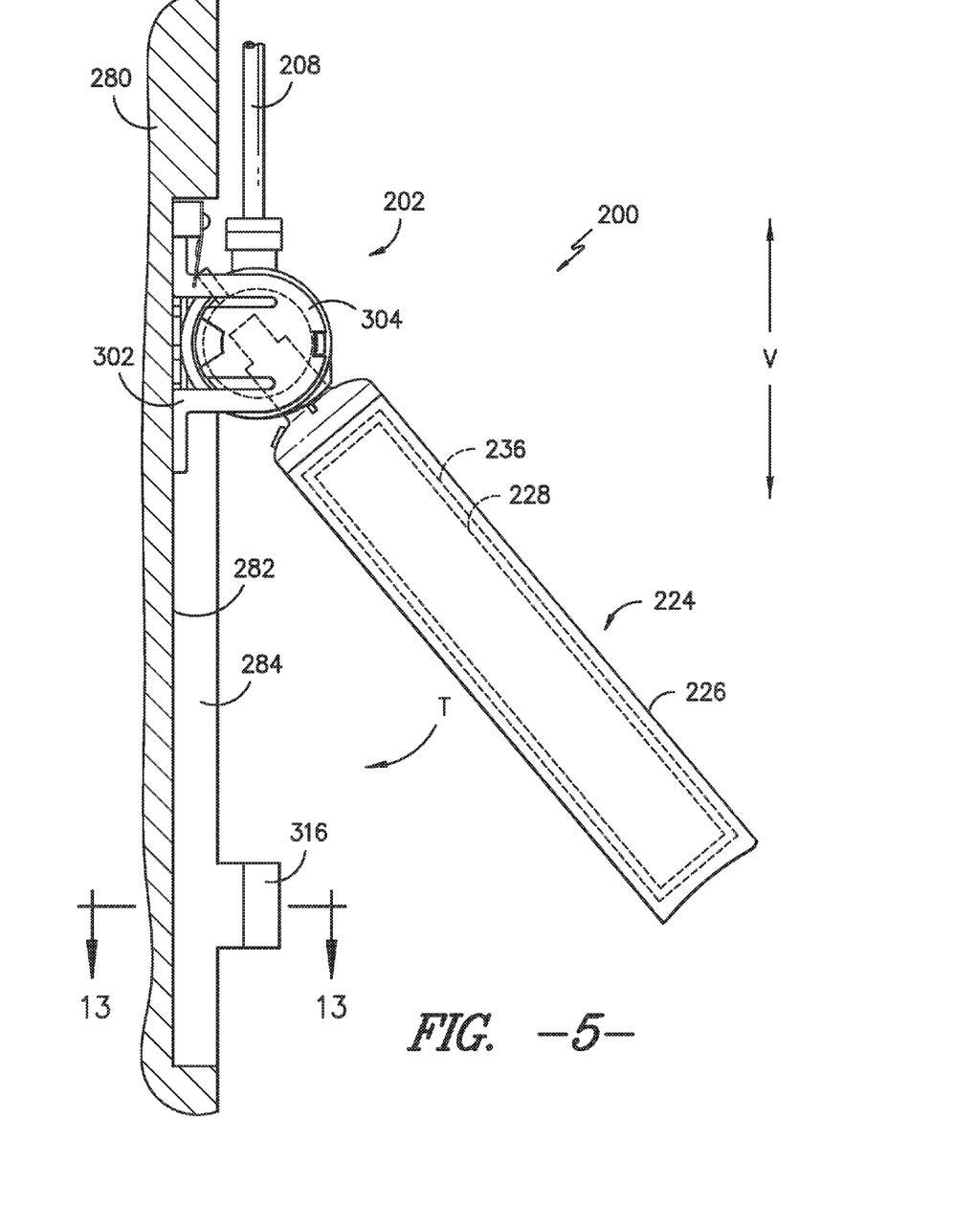
FIG. 5 provides a side view of the exemplary water filter assembly of FIG. 3 with a filter cartridge in an uninstalled position.

As shown in FIG. 5, for this exemplary embodiment, filter cartridge 224 includes a filter housing 226 defining a chamber 236 into which a filter media 228 is received. Filter element 228 may be constructed from a variety of different types of filter media including textiles, resins, webs, activated carbon, and other components as well. Filtration with filtering element 228 may be based upon e.g., size exclusion, adsorption, and/or other mechanisms. While a variety of different constructions may be used, filter media 228 may be cylindrically-shaped and configured so that water flows radially inward towards a center of filter media 228 as particulates or other matter are removed by the filter media.

Figure 6:
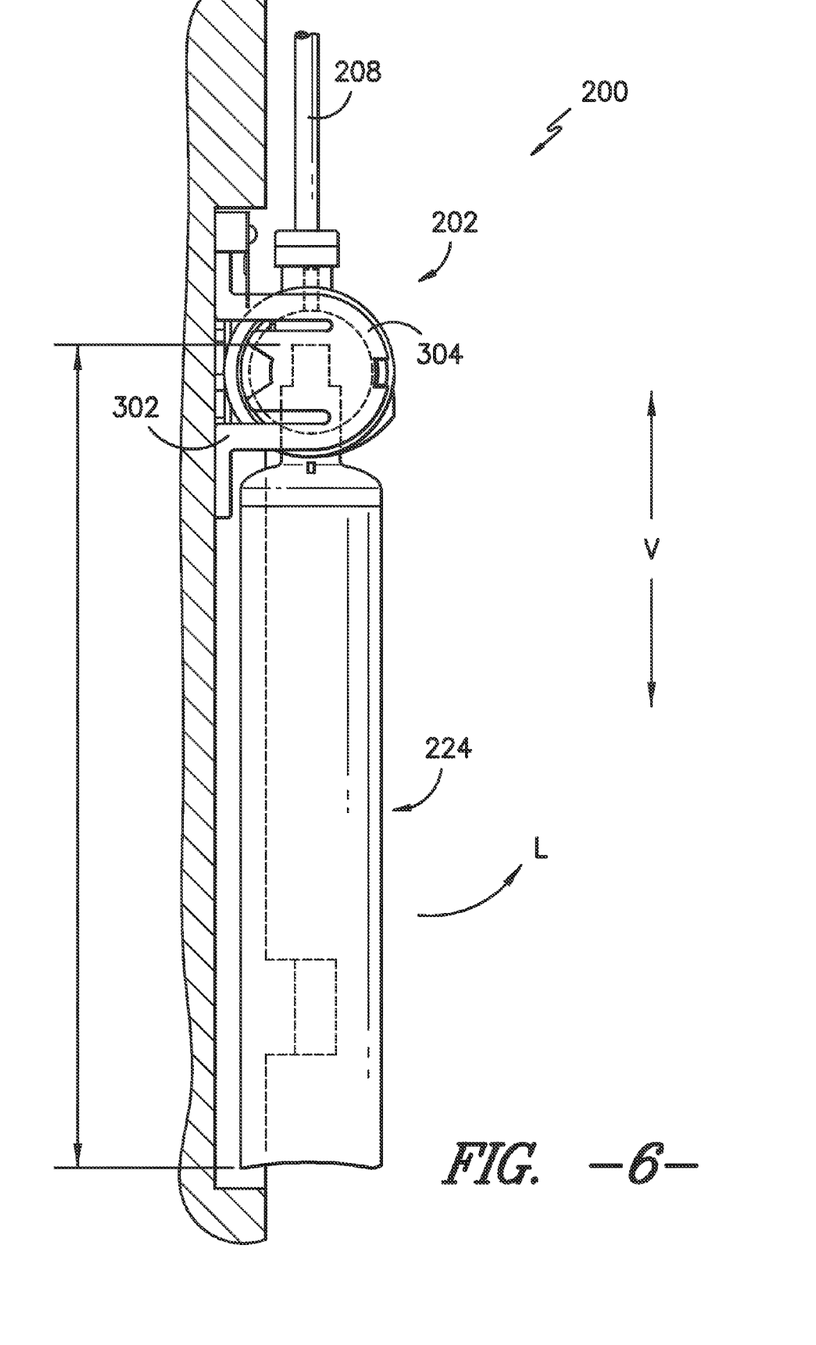
FIG. 6 provides a side view of the exemplary water filter assembly of FIG. 3 with a filter cartridge in the installed position.
Figure 7:
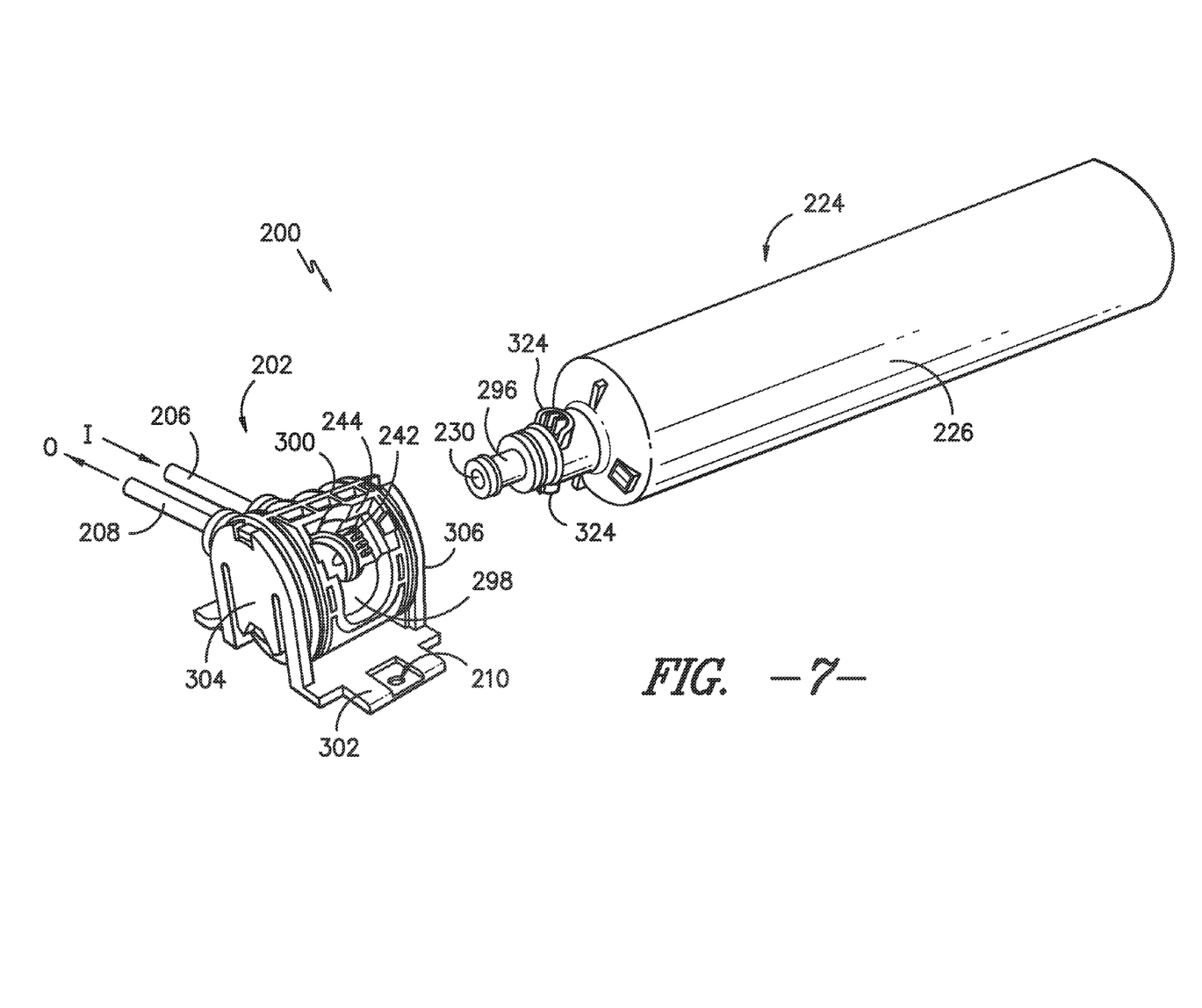
FIG. 7 provides an exploded view of the exemplary water filter assembly of FIG. 3.
Figure 8:
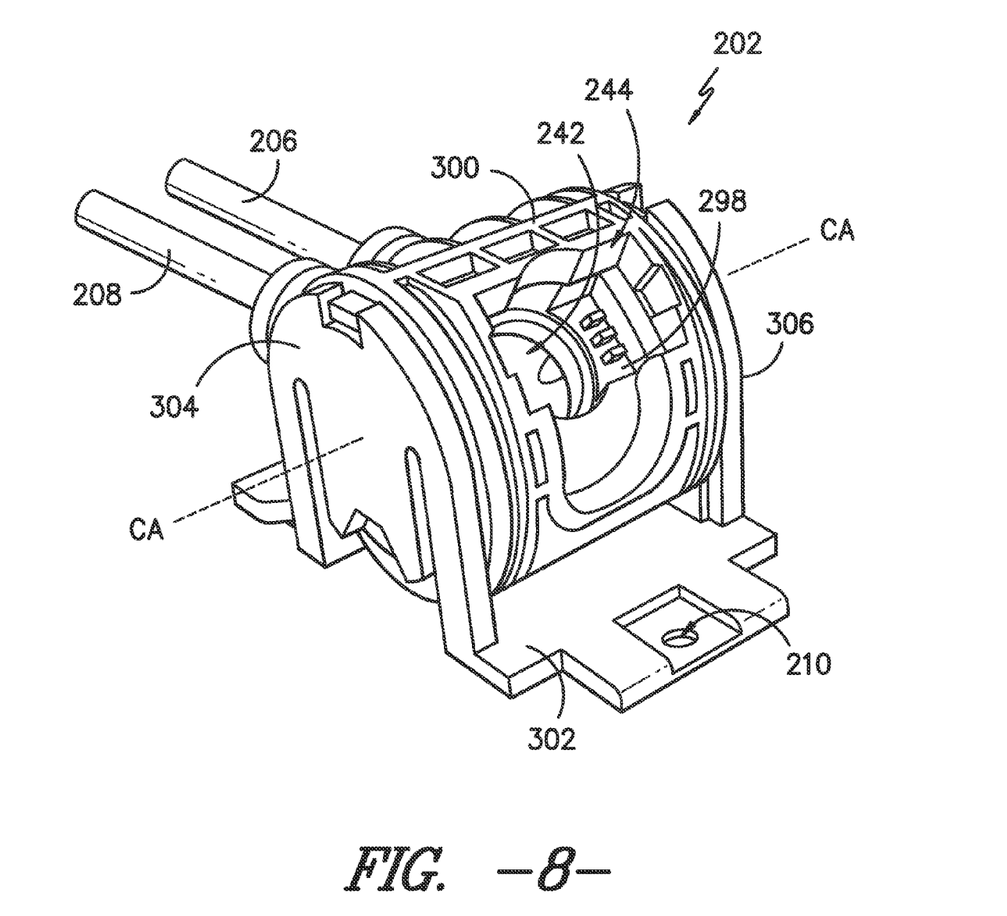
FIG. 8 is a perspective view of an exemplary filter manifold.

As shown in FIGS. 3 through 8, filter cartridge 224 is removably received into a port 242 of a filter manifold 202. Filter cartridge 224 includes a boss 296 defining a filter outlet 230 that is placed into fluid communication with outlet 208 when boss 296 is inserted (arrow M in FIG. 4) into port 242. Filter manifold 202 includes a rotatable cylinder 298 that is in fluid communication with inlet 206 and outlet 208. Rotatable cylinder 298 defines port 242 into which boss 296 is removably received. Filter manifold 202 also includes a housing 300 containing cylinder 298 while allowing the rotation of cylinder 298 about central axis CA (FIG. 8). Housing 300 is attached between a pair of arms 304, 306 of a mounting bracket 302. Aperture 210 provides for fixing bracket 302 to a surface.

Figure 3:
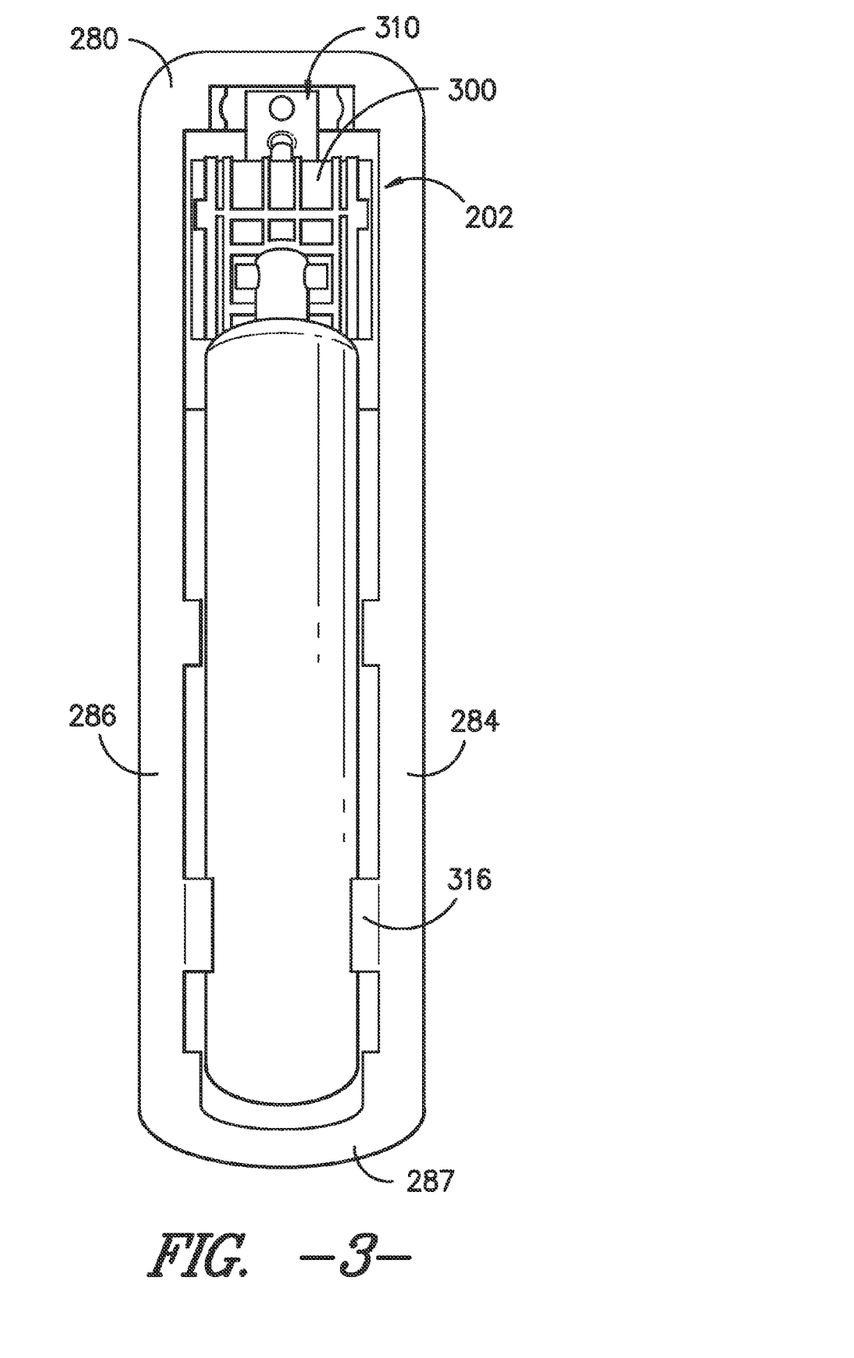
FIG. 3 is a front view of an exemplary embodiment of a water filter assembly of the present invention.
Figure 4:
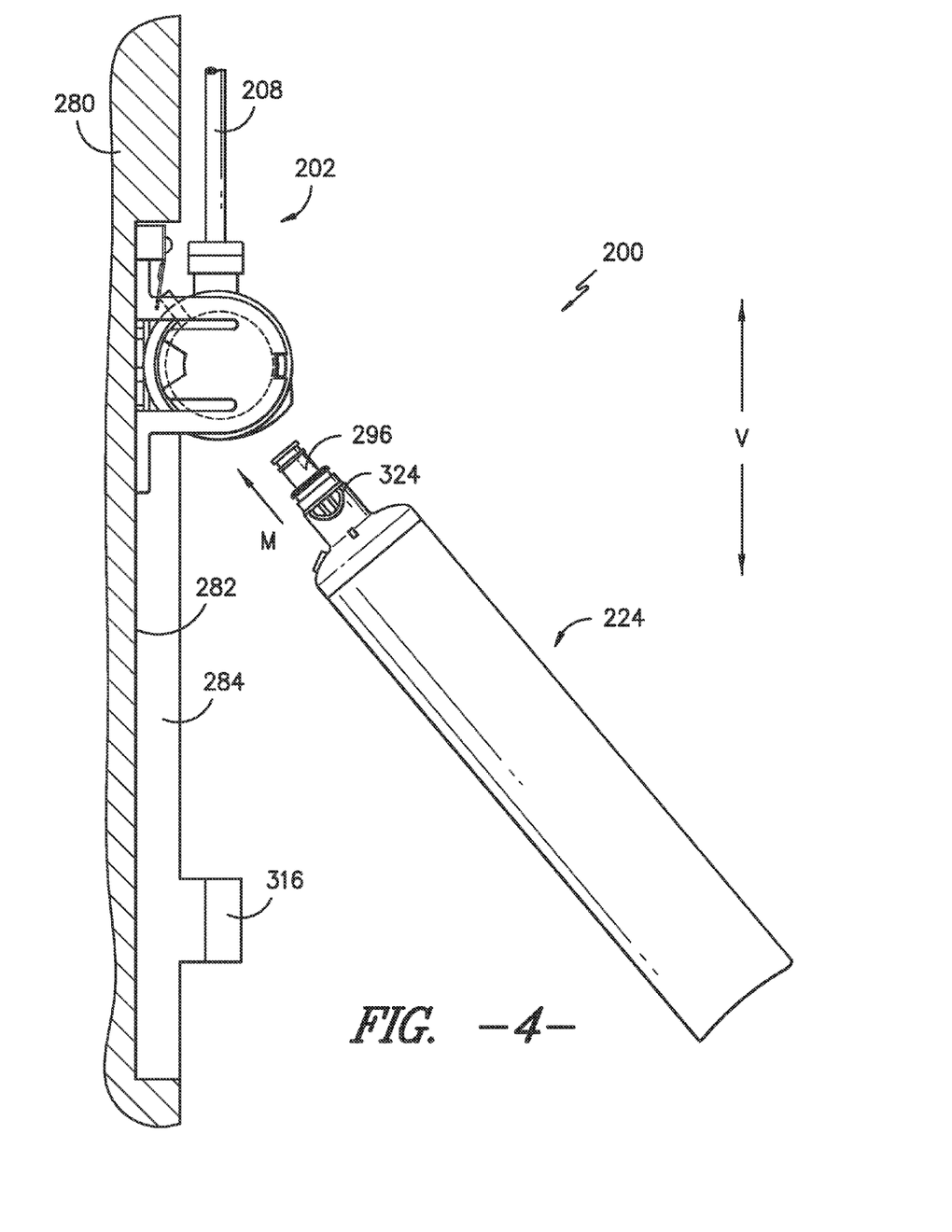
FIG. 4 provides a side view of the exemplary water filter assembly of FIG. 3 with a filter cartridge uninstalled.
Figure 9:
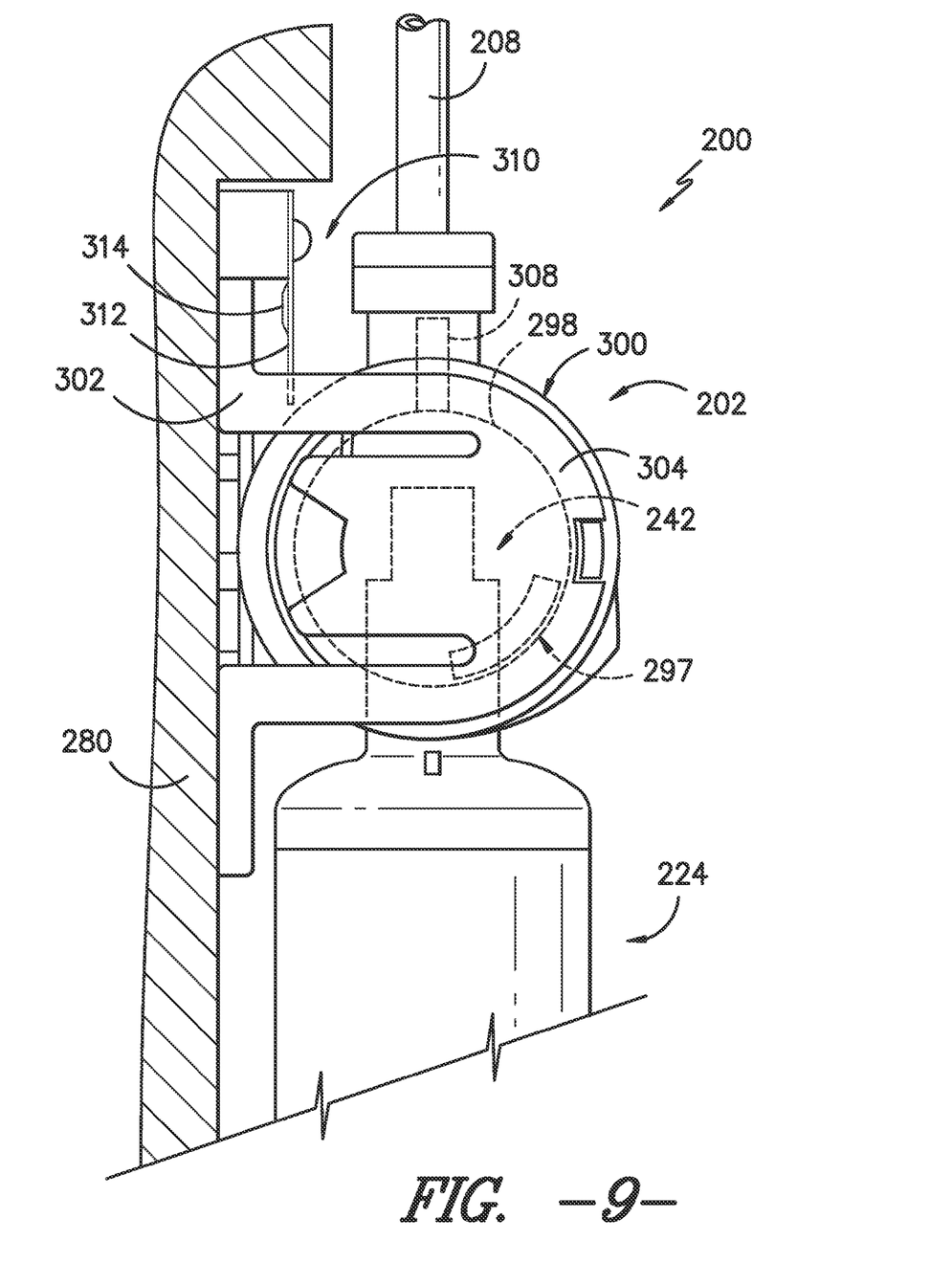
FIG. 9 is a close up, partial side view of the exemplary water filter assembly of FIG. 3.

Filter cartridge 224 is movable between an uninstalled position shown in FIG. 5 and an installed position shown in FIGS. 3, 6, and 9. More particularly, once filter cartridge 224 is inserted into port 242, cartridge 224 can be moved in the direction of arrow T (FIG. 5), which rotates cylinder 298 about central axis CA (FIG. 8) and locks cartridge 224 into port 242. Conversely, for removal, filter cartridge 224 can be moved in the direction of arrow L (FIG. 6), which rotates cylinder 298 within housing 300 and about central axis CA as cartridge 224 moves into the uninstalled position and is unlocked from port 242.

As shown in FIG. 7, for this exemplary embodiment, the boss 296 may include one or more locking tabs 324 radially projecting from the boss 296. For example, the boss 296 may include two diametrically opposed radially projecting locking tabs 324. The housing 300 defines an opening 244 sufficiently large to receive the locking tabs 324 therethrough. Once the boss 296 of the filter cartridge 224 is inserted into port 242 in the uninstalled position and the filter cartridge 224 is rotated into the installed position, the locking tab 324 is confined between cylinder 298 and the housing 300 to lock the boss 296 of the filter cartridge 224 into the port 242 of the filter manifold 202. More specifically, the housing 300 and the rotatable cylinder 298 define an arcuate slot 297 therebetween. In the installed position, the locking tab 324 is received and confined within the arcuate slot 297 such that the boss 296 of the filter cartridge 224 is locked in the port 242.

As shown in FIG. 7, the opening 244 defines a shape such that the manifold 300 prevents rotation of the filter cartridge 224 beyond the uninstalled position shown in FIG. 5. More specifically, in the uninstalled position, boss 296 contacts the upper edge of opening 244 thereby preventing rotation of the filter cartridge 224 beyond the uninstalled position. Similarly, opening 244 prevents rotation of the filter cartridge 224 beyond the installed position by providing contact between boss 296 and the lower edge of opening 244. Accordingly, the manifold 300 provides a rotational limit at each of the installed and uninstalled positions.

Figure 10:
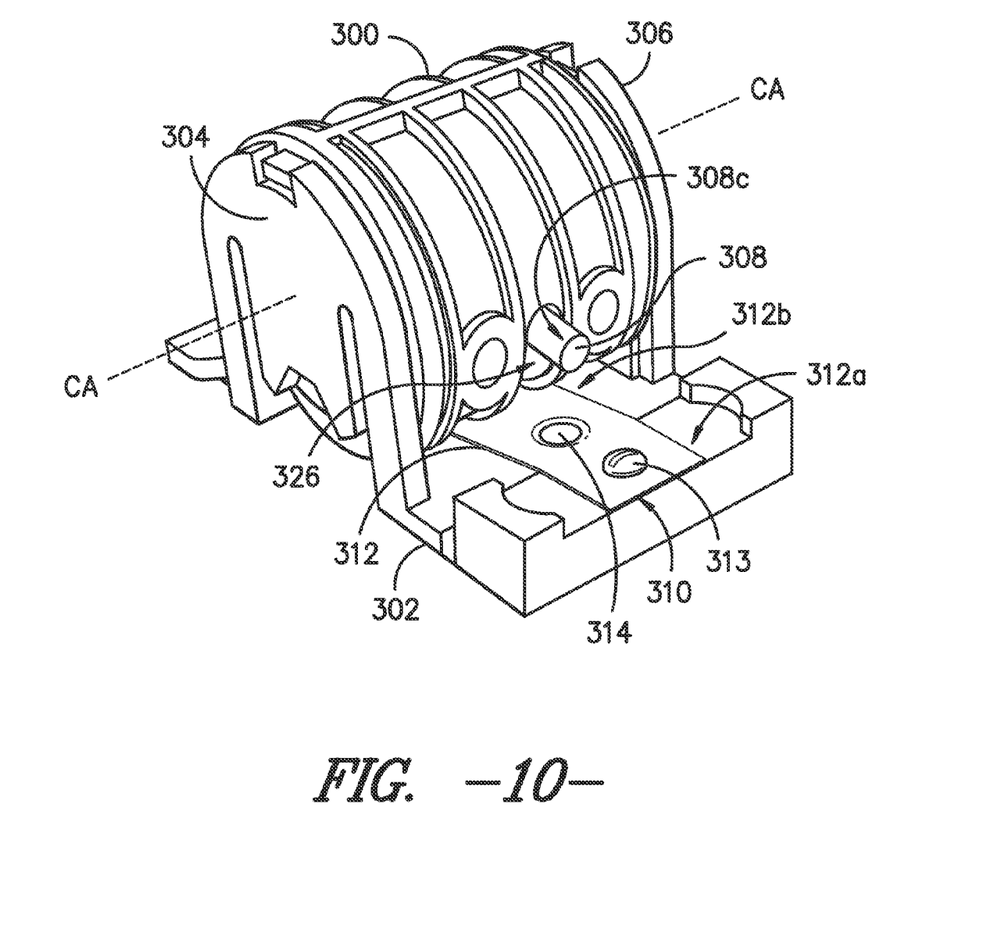
FIG. 10 is a perspective view of an exemplary filter manifold and noise generator in the installed position.
Figure 11:
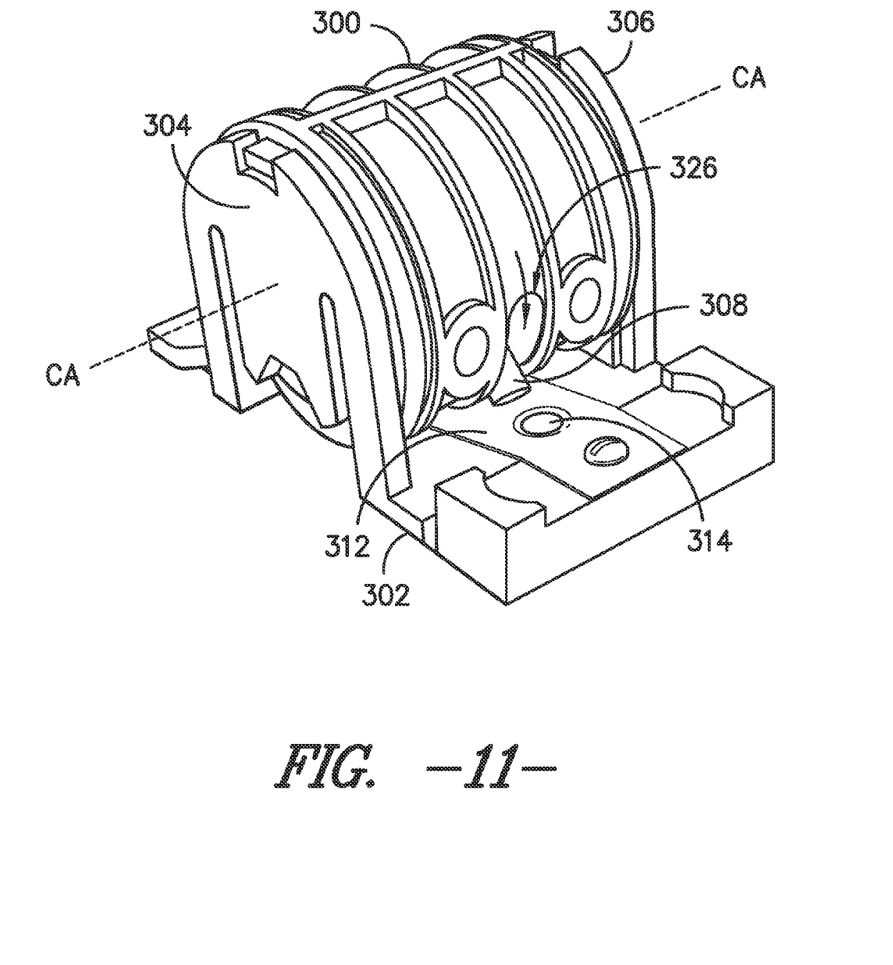
FIG. 11 is a perspective view of an exemplary filter manifold and noise generator in the uninstalled position.

As shown in FIGS. 9 through 11, for this exemplary embodiment, water filter assembly 200 includes a noise generator 310 positioned adjacent to the cylinder 298 of the manifold 202. An actuator 308 projects from the cylinder 298, and as the cylinder 298 is rotated between the installed position (FIG. 10) and the uninstalled position (FIG. 11) the actuator 308 engages the noise generator 310 and creates an audible noise. The actuator 308 has an attached end and a free, distal end 308a (FIG. 10) protruding radially away from the cylinder 298 to engage the noise generator 310. As shown in FIGS. 10 and 11, the actuator 308 may have a cylindrical shape. However, in other embodiments, the actuator 308 may have any suitable shape. For example, the actuator 308 may have a circular cross-section and a conical shape. Alternatively, the actuator may have a square or rectangular cross section, for example.

Additionally, the actuator 308 may be an integral feature of the rotatable cylinder 298 or may be a separate part that is attached to the cylinder 298. The actuator 308 may be attached with adhesive or any other suitable technique. Additionally, the resilient member 312 and the actuator 308 may be made from metal, plastic, or any other suitable material. The dimensions and materials of the resilient member 312 and the actuator 308 may affect the amount of resistance provided by the resilient member 312 to rotation of the filter cartridge 224 from the installed position to the uninstalled position. Therefore, these design parameters may be determined according to the desired resistance.

As shown in FIGS. 10 and 11, for this exemplary embodiment, the housing 300 may define an opening or slot 326, and the actuator 308 may protrude through the opening or slot 326. The slot 326 extends along a curvature that matches the rotation of cylinder 298 within housing 300. As the cylinder 298 is rotated from the installed position (FIG. 10) to the uninstalled position (FIG. 11), the radially protruding actuator 308 moves in the slot 326 towards the resilient member 312. The slot 326 of the housing 300 may be equally spaced between the arms 304, 306 of the mounting bracket 302. However, the slot 326 and actuator 308 may be disposed at any suitable location between the arms 304, 306 of the mounting bracket 302. For example, in other embodiments, the actuator 308 and slot 326 may be directly adjacent to one of the arms 304, 306.

The noise generator 310 may be any suitable mechanical sound generating device. As shown in FIG. 10, for this exemplary embodiment, the noise generator 310 includes a resilient member 312 such that the actuator 308 bends the resilient member 312 as the cylinder 298 is rotated between the installed position (FIG. 10) and the uninstalled position (FIG. 11) to create the audible noise. More specifically, resilient member 312 may comprise a dimple 314. The dimple 314 has a deformed condition and an undeformed condition, and the dimple 314 is biased towards the undeformed condition. As the actuator 308 engages and bends the resilient member 312, the dimple 314 changes from the undeformed condition to the deformed condition and thereby generates the audible noise. As illustrated in FIGS. 10 and 11, the resilient member 312 may be a thin rectangular strip of flexible material.

As shown in FIGS. 10 and 11, for this exemplary embodiment, the resilient member 312 of the noise generator 310 may be a leaf spring having a free end 312b and a mounted end 312a. As shown in FIG. 10, the mounted end 312b of the resilient member 312 may be mounted using a fastener 313. In other embodiments, the resilient member may be mounted using adhesive or may be an integral feature of the base 280 or the bracket 302.

As illustrated in FIG. 10, for this exemplary embodiment, the resilient member 312 is generally tangential to the outer surface of the manifold 300. The resilient member also contacts the housing 300 in the uninstalled position. In other embodiments, the resilient member 312 may not contact the housing 300 when the rotatable cylinder 298 is in the uninstalled position. In yet other embodiments, the resilient member 312 may be disposed in a generally radial direction with respect to the central axis CA of the manifold 300.

Figure 12:
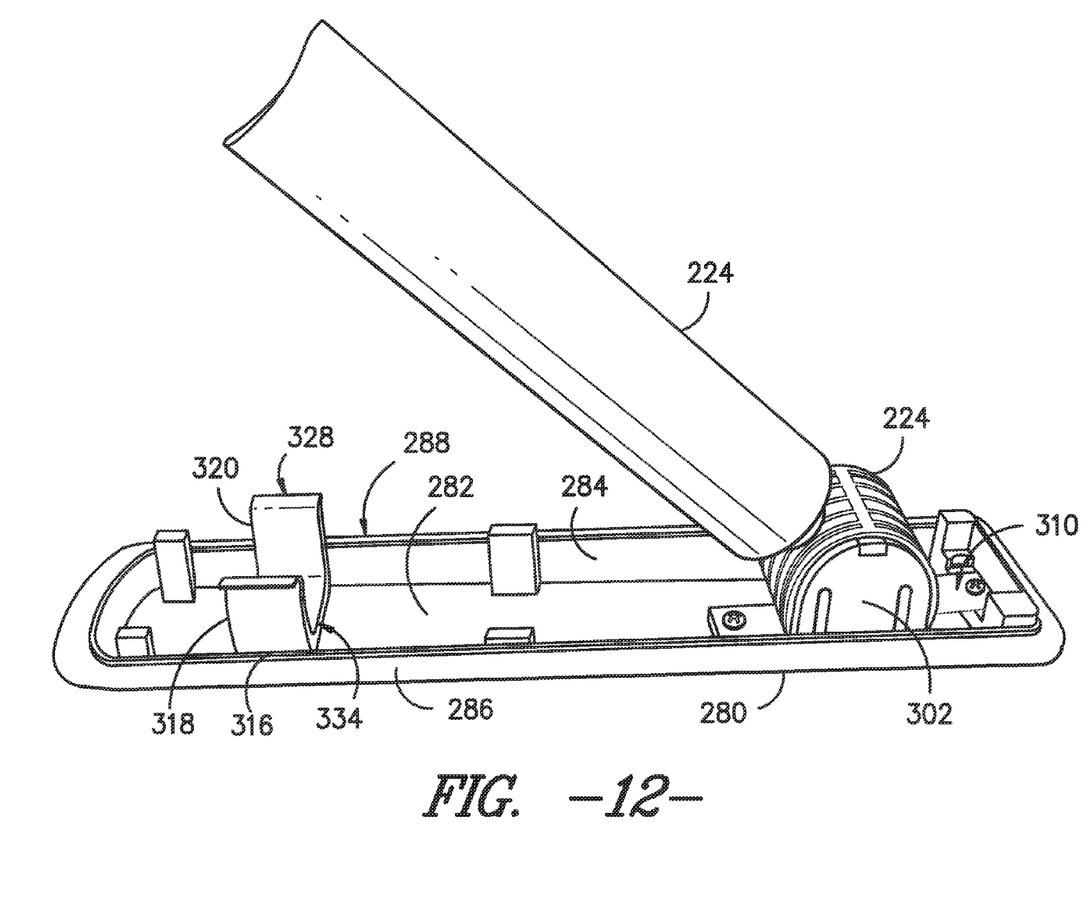
FIG. 12 is a perspective view of the exemplary water filter assembly of FIG. 3 with a filter cartridge in the uninstalled position.
Figure 13:
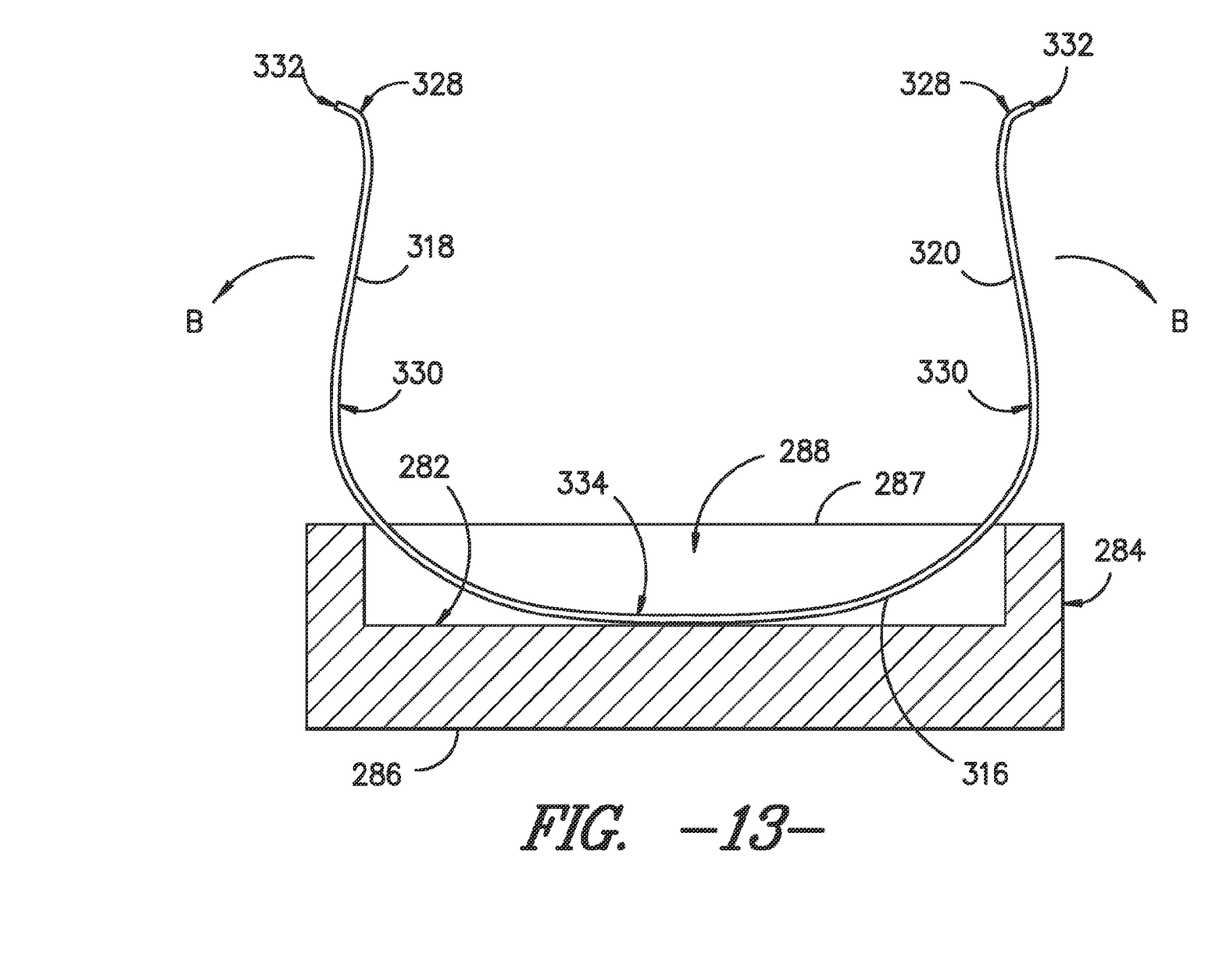
FIG. 13 is a cross-section view along section 13-13 of FIG. 5.

As shown in FIGS. 4, 5, 6, and 12, for this exemplary embodiment, the water filter assembly 220 includes a retaining clip 316 mounted to the base 280. The retaining clip 316 has a pair of arms 318, 320 protruding away from the base 280 for receiving the filter cartridge 224 in the installed position. As shown in FIGS. 12 and 13, the retaining clip 316 may be one continuous member having a middle portion 334 that is attached to the base 280. The continuous member may include each of the arms 318, 320. Alternatively, in another embodiment, the retaining clip may comprise two separate and distinct arms 318, 320, and each of the arms 318, 320 may be attached to a respective one of the sidewalls 284, 286 of base 280 without a middle portion 334 connecting one arm 318 with the other arm 320. In yet other embodiments, the retaining clip 316 may be an integrally formed feature of the base 280.

As shown in FIGS. 12 and 13, for this exemplary embodiment, each of the pair of arms 318, 320 of the retaining clip 316 includes an arcuate section 330 curved inward toward the filter cartridge 224 in the installed position of the filter cartridge 224. Each of the pair of arms 318, 320 includes a free end 332 and a guide section 328. The guide section 328 is defined between the arcuate section 330 and the free end of each of the arms 318, 320. The guide section 328 protrudes outwardly away from the filter cartridge 224 in the installed position of the filter cartridge 224. As shown in FIG. 13, the guide section 328 also protrudes upward and away from the base 280.

As the filter cartridge 224 is rotated from the uninstalled position (FIG. 12) into the installed position (FIG. 6), the guide section 328 of each of the arms 318, 320 contacts the filter housing 226 of the filter cartridge 224. As the filter cartridge 224 is forced into the installed position, the filter cartridge 224 bears against each of the arms 318, 320 and bends (arrow B) each of the arms 318, 320 outward and apart to allow the cartridge 224 to be received in the receiving space 288 between the arms 318, 320 in the installed position. More particularly, the filter cartridge 224 bears against the guide section 328 of each of the arms 318, 320 to bend the arms 318, 320 apart. Once the filter cartridge 224 is in the installed position, the arms 318, 320 hold the filter cartridge 224 in the installed position and resist rotation of the filter cartridge 224 toward the uninstalled position.

When a user rotates the filter cartridge 224 from the installed position back into the uninstalled position, the user must force the filter cartridge 224 upward against the arms 318, 320 and bend (arrow B) the arms 318, 320 apart to allow the filter cartridge 224 to pass out of the installed position. The retaining clips 316 may be any suitable material including metal and plastic. The thickness of the retaining clips 316 may be selected depending on the material of the retaining clips 316 and the desired force required to move the filter cartridge 224 in and out of the installed position.

The water filter assembly 200 may include multiple retaining clips 316. For this exemplary embodiment, at least one of the retaining clips 316 is disposed greater than half of the length 322 of the filter cartridge 224 from the manifold 202. Any additional suitable mechanisms such as a strap may be used to secure the filter cartridge 224 in the installed position.

As shown in FIGS. 5, 12, and 13, for this exemplary embodiment, the base 280 includes a middle surface 282 and a pair of side walls 284, 286. The middle surface 282 is disposed between the pair of side walls 284, 286, and the pair of side walls 284, 286 protrude away from the middle surface 282. The middle surface 282 and the pair of side walls 284, 286 form a receiving space 288, and the filter cartridge 224 is received at least partially within the receiving space 288 in the installed position (FIG. 6). Each of the side walls 284, 286 are orthogonal to the middle surface 282. The base 280 also includes an end wall 287. In other embodiments, the side walls 284, 286 may be not be orthogonal to the middle surface 282. Rather, the side walls 284, 286 and the middle surface 282 may be one continuously curved surface that is complementary to the outer surface of filter housing 226 of the filter cartridge 224.

The side walls 284, 286 and end wall 287 may serve as a visual indication to a user that the filter cartridge 224 is not removed by twisting the filter cartridge 224. Rather, the filter cartridge 224 is removed by rotating (L) the filter cartridge 224 from the installed position (FIG. 6) to the uninstalled position (FIG. 5). Additionally the retaining clip 316 may also serve as a visual indication that the filter cartridge 224 should be rotated (L) to the uninstalled position to remove the filter cartridge 224.

Additionally, the noise generator 310 may create an audible noise as the cylinder reaches the uninstalled position (FIG. 5) to indicate that the filter cartridge 224 may be removed from the filter manifold 202 by pulling the filter cartridge out (opposite arrow M). A label or sticker may be visibly located in the upper fresh food chamber 122, for example, instructing a user to lift or rotate the filter cartridge 224 outwards until hearing a "click."

In other embodiments, the noise generator may create an audible noise as the filter cartridge 224 reaches the installed position. The noise generator may make several audible noises at various intermediary positions between the installed and uninstalled position. For example, the noise generator may make three distinct audible noises as the filter cartridge is rotated from the installed position to the uninstalled position. A label or sticker may instruct a user to rotate the filter cartridge 224 outwards until hearing three "clicks."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly, comprising:
    a manifold that comprises
        a housing that defines an inlet for receiving unfiltered water into the water filter assembly and an outlet for directing filtered water out of the water filter assembly
        a cylinder rotatably received within the housing and in fluid communication with the inlet and outlet, the cylinder defining a port, the cylinder rotatable within the housing between an installed position and an uninstalled position;
        an actuator projecting from the cylinder;
    a filter cartridge removably received into the port, the filter cartridge comprising a filter housing and a filtering media positioned therein for filtering a flow of water through the water filter assembly, the filter cartridge rotatable with the cylinder between the installed position and the uninstalled position; and
    a noise generator positioned adjacent to the cylinder such that the actuator engages the noise generator and creates an audible noise as the cylinder is rotated between the uninstalled position and the installed position.

2. A water filter assembly as in claim 1, wherein the filter cartridge further comprises a boss configured for receipt into the port.

3. A water filter assembly as in claim 1, wherein the noise generator comprises a resilient member such that the actuator bends the resilient member to create the audible noise as the cylinder is rotated between the uninstalled position and the installed position.

4. A water filter assembly as in claim 3, wherein the resilient member is a leaf spring, and the resilient member has a free end and a mounted end.

5. A water filter assembly as in claim 3, wherein the noise generator further comprises a dimple having a deformed condition and an undeformed condition, and the dimple is biased towards the undeformed condition such that the dimple generates the audible noise as the dimple changes from the undeformed condition to the deformed condition as the resilient member is bent.

6. A water filter assembly as in claim 1, wherein the water filter assembly further comprises a retaining clip having a pair of arms within which the filter cartridge is received when rotated into the installed position.

7. A water filter assembly as in claim 6, wherein the filter cartridge defines a length and the pair of arms of the retaining clip is disposed greater than half of the length of the filter cartridge from the manifold.

8. A water filter assembly as in claim 1, wherein the filter cartridge comprises
    a boss extending from an end of the filter cartridge, and
    a locking tab projecting from the boss;
    wherein the housing of the manifold defines an opening, and the opening is sufficiently large to receive the locking tab of the filter cartridge therethough in the uninstalled position.

9. A water filter assembly as in claim 8, wherein the housing of the manifold and the cylinder define an arcuate slot therebetween, and the locking tab of the filter cartridge is received in the slot in the installed position.

10. A water filter assembly as in claim 1, wherein the housing of the manifold defines an opening for the actuator to project therethrough.

11. A water filter assembly comprising:
    a base;
    a manifold mounted to the base, the manifold comprising
        a housing that defines an inlet for receiving unfiltered water into the water filter assembly and an outlet for directing filtered water out of the water filter assembly;
        a cylinder rotatably received within the housing and in fluid communication with the inlet and outlet, the cylinder defining a port, the cylinder rotatable within the housing between an installed position and an uninstalled position;
        an actuator projecting from the cylinder;
    a filter cartridge comprising a boss, a filter housing, and a filtering media positioned therein for filtering a flow of water through the water filter assembly, the filter cartridge rotatable with the cylinder between the installed position and the uninstalled position, the boss selectively received in the cylinder of the manifold in the uninstalled position, the boss of the filter cartridge locked in the cylinder in the installed position;
    a retaining clip mounted to the base, the retaining clip having a pair of arms protruding away from the base for receiving the filter cartridge therebetween in the installed position; and
    a noise generator positioned adjacent to the cylinder such that the actuator engages the noise generator and creates an audible noise as the cylinder is rotated between the uninstalled position and the installed position.

12. A water filter assembly as in claim 11, wherein the base comprises a middle surface and a pair of side walls, the surface disposed between the pair of side walls, the pair of side walls protruding away from the middle surface such that the surface and the pair of sidewalls define a filter cartridge receiving space, and the filter cartridge is at least partially received in the receiving space in the installed position.

13. A water filter assembly as in claim 12, wherein each of the pair of side walls of the base is orthogonal to the middle surface of the base.

14. A water filter assembly as in claim 12, wherein each of the arms of the retaining clip is attached to a respective one of the pair of side walls of the base.

15. A water filter assembly as in claim 11, wherein the retaining clip is a continuous member and has a middle portion attached to the base, and the continuous member comprises each of the pair of arms.

16. A water filter assembly as in claim 11, wherein each of the pair of arms of the retaining clip defines an arcuate section curved inward toward the filter cartridge in the installed position.

17. A water filter assembly as in claim 16, wherein:
each of the pair of arms of the retaining clip comprises a free end and a guide section; and
the guide section is defined between the arcuate section and the free end, and the guide section protrudes away from the filter cartridge in the installed position to guide the filter cartridge between the pair of arms.

18. A water filter assembly as in claim 11, wherein the housing of the manifold and the cylinder define an arcuate slot therebetween, and wherein the filter cartridge includes a locking tab received in the slot when in the installed position to lock the boss of the filter cartridge in the cylinder of the manifold when in the installed position.

19. A water filter assembly as in claim 18, wherein the actuator has an attached end and a free end, and the attached end is attached to the cylinder of the manifold, and the free end protrudes radially away from the cylinder of the manifold and engages the noise generator as the cylinder is rotated between the uninstalled position and the installed position.

20. A water filter assembly as in claim 19, wherein the actuator has a cylindrical shape.

\* \* \* \* \*